United States Patent [19]

Tannenbaum

[11] 4,150,731
[45] Apr. 24, 1979

[54] LOCKING DEVICE

[76] Inventor: Wesley Tannenbaum, 15 Francis St., Newton Center, Mass. 02159

[21] Appl. No.: 860,334

[22] Filed: Dec. 14, 1977

[51] Int. Cl.² .......................................... B60R 25/04
[52] U.S. Cl. .............................. 180/114; 307/10 AT; 340/63
[58] Field of Search .................. 180/114; 307/10 AT; 340/63, 64, 164 R; 317/141 S

[56] References Cited

U.S. PATENT DOCUMENTS

| | | | |
|---|---|---|---|
| 3,659,266 | 4/1972 | Myerle | 180/114 X |
| 3,781,804 | 12/1973 | Lederer | 307/10 AT X |
| 3,790,933 | 2/1974 | Cort | 340/63 |
| 3,852,614 | 12/1974 | Carlson | 180/114 X |
| 3,956,732 | 5/1976 | Teich | 180/114 X |
| 3,967,166 | 6/1976 | Wei | 307/10 AT X |
| 3,967,239 | 6/1976 | Steele | 180/114 X |
| 3,975,645 | 8/1976 | Morar | 307/10 AT |
| 4,016,537 | 4/1977 | Ray | 307/10 AT X |
| 4,083,424 | 4/1978 | von den Stemmen | 180/114 |

Primary Examiner—Joseph F. Peters, Jr.
Assistant Examiner—Terrance L. Siemens
Attorney, Agent, or Firm—Jacobs & Jacobs

[57] ABSTRACT

An anti-theft lock arrangement for a motor vehicle comprises a lock mechanism that normally disables the motor vehicle and a timing mechanism, actuated when the ignition switch is switched to a first position, for transmitting a lock release signal to unlock the locking device after a predetermined time interval from the instant of actuation of the timing mechanism, the locking mechanism being unlocked only when the lock release signal is applied thereto and the ignition switch is switched to a second position after the time interval and during the duration of the lock release signal, neither the predetermined time interval nor the lock release signal being capable of being sensibly perceived.

8 Claims, 2 Drawing Figures

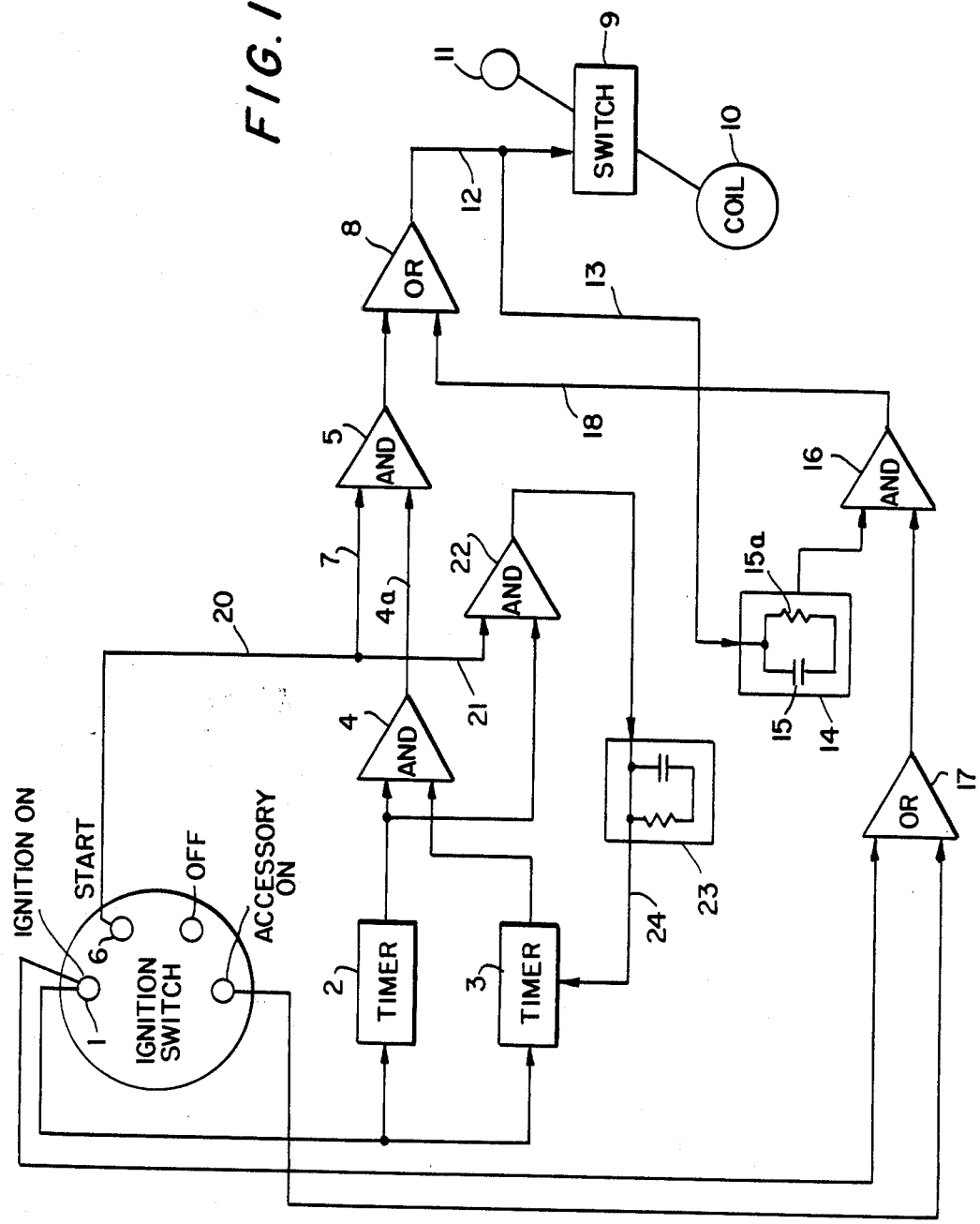

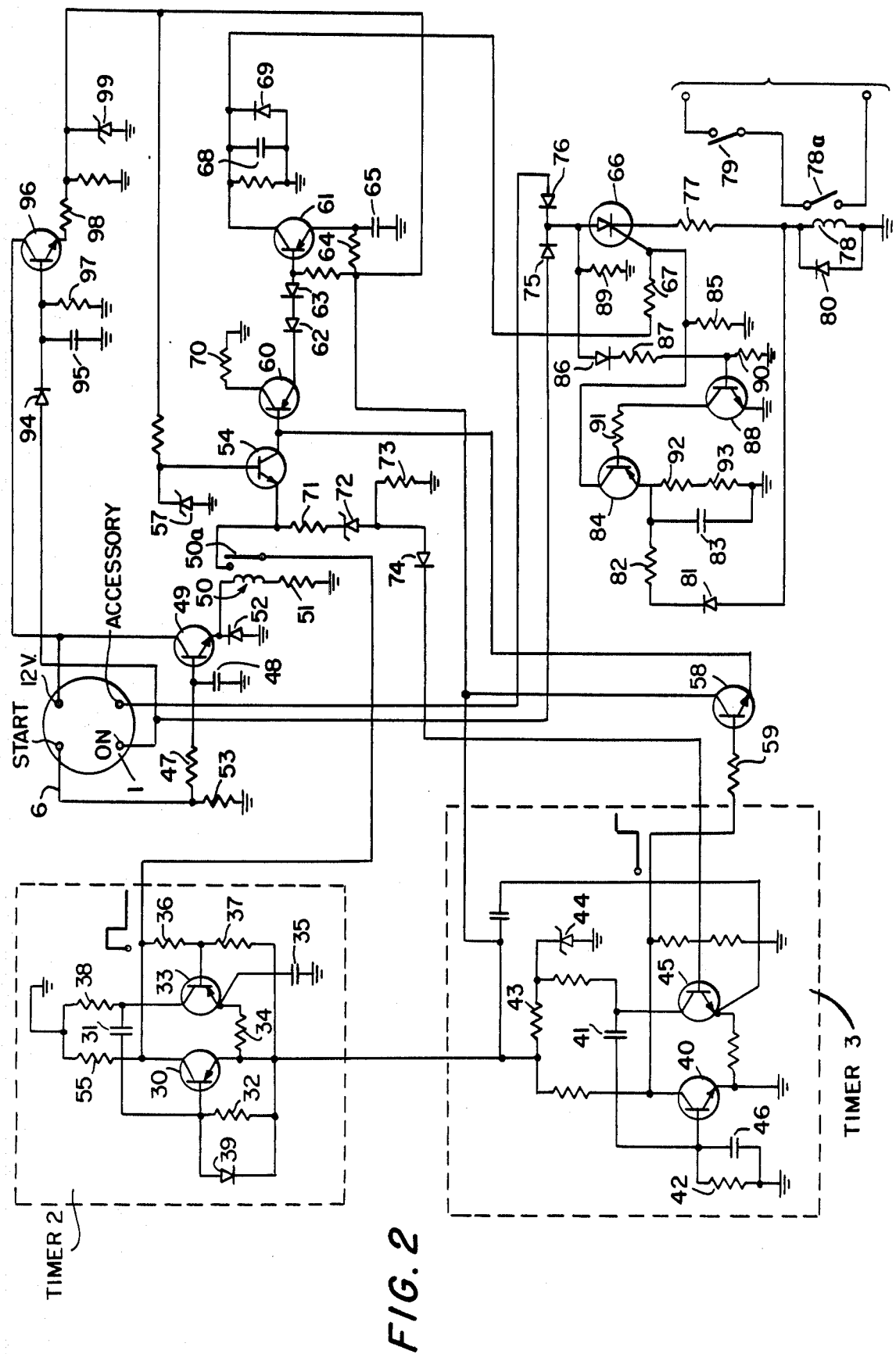

LOCKING DEVICE

The present invention relates to a device for preventing unauthorized use of an internal combustion engine, and more particularly to preventing theft of automobiles.

Automobile theft is a notorious problem and often is accomplished by bypassing the ignition switch and "jumping" the ignition circuit. Many devices have been proposed for thwarting automobile theft, but none has achieved widespread acceptance due to the costs of manufacture or installation or both, or due to the fact that the devices simply will not prevent a determined thief from accomplishing his objective.

The present invention relates to an automobile antitheft device that is economical to manufacture and install and is readily adapted to be part of the original equipment furnished by the automobile manufacturer. Alternatively, the device of the present invention can be readily installed by the automobile owner on existing vehicles.

In principle, the anti-theft device of the present invention provides an electronic "lock" that is opened through proper use of a "combination" known only to the authorized users of the vehicle in which the lock is installed. The device according to the present invention comprises a normally open switch adapted to be connected in series with the ignition circuit and the ignition switch of the vehicle, and electronic means for closing the switch. The electronic means provide a "time window" that will allow the normally open switch to be closed only during the brief period of time when the time window is open. The "combination" to the auto lock of the present invention is the knowledge of when the time window is open.

A convenient time delay is between 1 and about 20 seconds, say 3 seconds, and the time window will stay in the normally closed position until the expiration of the preset time delay. The time delay is activated when the ignition key is turned to the ON position, and the normally open switch that causes the ignition circuit to be disabled can be closed only when the ignition key is moved to the START position after the expiration of the preset time delay. To prevent the unauthorized user from simply waiting for a long period of time before turning the ignition key from ON to START, the time window opens after the predetermined period of time but then closes after 2 seconds (or other preset period), so that the window is open only for a 2-second period. Hence, the user must turn the ignition key to ON, wait the predetermined delay period (in this case 3 seconds), and then turn the ignition key to START after the 3 seconds have elapsed but before 5 seconds have elapsed.

The present invention is illustrated by the accompanying drawings in which:

FIG. 1 is a block diagram of the logic circuitry employed in the device of the present invention; and FIG. 2 is a circuit diagram of the device of the present invention.

Referring now to FIG. 1, when the ignition switch is moved to the ON position 1, an appropriate signal is sent from the ignition switch position 1 to timers 2 and 3. When activated, timer 2 generates a pulse for 3 seconds at high level and thereafter returns to a low level, and timer 3 generates a pulse for 5 seconds at a low level and thereafter returns to a high level. The pulses from the timers 2 and 3 are applied to inputs of an AND gate 4 which is operable to produce a high pulse only when both of the inputs are low. In the embodiment described, both outputs of timers 2 and 3 are low only after the expiration of three seconds and before the commencement of the sixth second, and hence a 2-second open time window is created. The output of AND gate 4 is applied to the input of AND gate 5. Also applied to the input of AND gate 5 is the output of the START switch 6. AND gate 5 is operable to deliver a high pulse only when both of its inputs are high. The input 4a is determined from AND gate 4 and is high only during the 2 seconds when the time window is open. Accordingly, when the ignition switch is turned to START, a high pulse will be delivered to the input of AND gate 5 via line 7, which must be high simultaneously with the input via line 4a in order to obtain a high signal from AND gate 5 to permit the engine to be started. Consequently, if the ignition switch is turned to START before or after the 2-second open time window, the output of gate 5 will be low and, as will be evident from the description below, the ignition circuit will remain disabled.

The output from AND gate 5 is applied to the input of OR gate 8, which is operable to deliver a high pulse to switch 9 when either of its inputs is high. The application of the high pulse to switch 9 closes the ignition circuit of the engine and permits the coil 10 to deliver power to the distributor 11, thereby starting the engine.

When the ignition switch is turned to OFF, the signals from the ignition ON position 1 are discontinued, and hence there is no input to or output from AND gate 4. If the ignition switch is then turned to the ON position 1 and then to the START position 6 without the requisite delay, there will be a high input through line 7 but a low input through line 4a and hence the output from AND gate 5 will be low. As soon as the ignition switch is turned to the OFF position, switch 9 opens, and thus the ignition circuit will remain disabled because the input to the OR gate 8 from AND gate 5 is low. Authorized operation of the vehicle then requires the use of the proper "combination", and the starting procedure outlined above must be repeated.

In order to provide some margin for error, or to allow the vehicle to be started without disclosing the combination to others, a bypass system is provided. Thus, the output of the OR gate 8 is applied through lines 12 and 13 to a capacitor circuit trigger 14. A high pulse from the OR gate 8 charges the capacitor 15 of the trigger 14, and through the time determined by the combination of the RC network of resistor 15a and capacitor 15, a high pulse is then delivered from the trigger circuit 14 to the input of an AND gate 16.

The ignition ON and accessory ON positions of the ignition switch deliver high pulses to an OR gate 17 operable to have a high output when either of its inputs is high. The output from the OR gate 17 is applied to the AND gate 16, which is designed to have a high output when both of its inputs are high. The output from the AND gate 16 is applied via line 18 to the OR gate 8. If, after operation of the vehicle, the ignition switch is turned to the OFF position, or if the ignition circuit is interrupted in any other way, e.g. if the engine stalls out or there is a loss of current, the trigger 14 will continue to generate a high pulse for a period of time determined by the time delay circuit therein because the capacitor 15 is in a charged state during operation of the vehicle. A suitable time delay for circuit 14 may be 2 minutes. If within this time delay, the ignition switch is turned to ignition ON or accessory ON, then the output of gate 17 will be high and both inputs to gate 16 will be high, thus applying a high input to the OR gate 8 via line 18. The high input via line 18 to the OR gate 8 not only closes the switch 9, which thus enables the engine to be restarted, but also recharges the capacitor 15 via the signal applied through lines 12 and 13. As long as the capacitor 15 is charged, the OR gate 8 will have the required high input signal via line 18 to continue to apply a high output signal to switch 9 to keep switch 9 closed during operation of the engine. The trigger 14 and the AND gate 16 thus function as a keep-alive circuit that bypasses the AND gate 5, since otherwise switch 9 would open during operation of the engine as soon as the time window closed after its 2-second open period. The keep-alive circuit is also very useful, for example, when the automobile is delivered to a parking lot attendant with instructions to leave the ignition switch in the ignition ON or accessory ON position so that the car can be restarted by the attendant without the need to divulge to him the combination to the ignition lock of the present invention. In all cases, the keep-alive circuit becomes operational only after the engine has been properly started, since the signal in lines 12 and 13 is generated only after the ignition switch is turned from ON to START during the period when the input 4a is high. Accordingly, while the keep-alive circuit by-passes the timers 2 and 3 to keep the lock "unlocked", the by-pass is effected only through the use of the "combination". Hence, unless the combination is known, and is used to start the engine in an authorized manner, the keep-alive circuit cannot be used.

In order to prevent the unauthorized user from by-passing the combination by turning the ignition key to ON and then to START and simply holding it in the START position until the time window opens, a high pulse is generated when the key is turned to START 6 via lines 20 and 21 to an input of AND gate 22. In addition, the output of timer 2 is applied to the other input of AND gate 22. AND gate 22 is operable to deliver a high pulse to the time delay circuit 23 when both inputs are high. If the key is turned to START when the output of timer 2 is low, i.e. after the 3-second delay has elapsed, then the output of AND gate 22 will be low and the time delay circuit 23 will not be energized. If, however, the ignition switch is turned to START 6 during the 3-second period, then both inputs to the AND gate 22 will be high, resulting in a high output, which in turn energizes the time delay circuit 23 and applies a signal via line 24 to timer 3, forcing the output of timer 3 to go up and hence causes the output of AND gate 4 to go low. The signal will be applied via line 24 to the timer 3 for the time period established by the time delay circuit 23 and, during this period, it is impossible to start the engine even if the proper starting procedure is used, because the time delay circuit 23 will cause timer 3 to apply a high signal to AND gate 4 during the penalty period established by the time delay circuit. A suitable penalty period is 2 minutes so that repeated guesses at the combination of the lock will require a minimum of 2 minutes per wrong guess. Several repeated wrong guesses will require the passage of a substantial period of time and should thwart the unauthorized user from his adventure.

In considering the circuit details of the components used in the present invention, the timer 2 generates a high potential level over the time delay associated with this timer. When the positive potential from the automobile battery, for example, is applied to the circuit by means of turning the ignition key to the ON position 1, a high potential level is applied to the collector 30 of a PNP transistor, a predetermined number of seconds after the battery potential, or B+. The delay time is determined by the charging of capacitor 31 through resistor 32. This time interval determines the initial time delay in the device of the present invention. The circuit operates as follows:

The battery potential B+ is applied to the emitter of transistor 30 as well as to the emitter of PNP transistor 33 through resistor 34. Due to the time delay in applying the battery potential to the transistor 30, as a result of the RC network 34, 35, the transistor 30 conducts, and applies a high level potential to the base of transistor 33 via the collector of transistor 30 and the attenuator of resistors 36 and 37. This causes transistor 33 to remain turned off. The collector of transistor 30 remains at high potential until capacitor 31 becomes fully charged via resistor 32, and to a small extent, via current return resistor 38. When capacitor 31 is fully charged, the base of transistor 30 becomes sufficiently high to turn off transistor 30. This removes the high potential from the base of transistor 33, and allows this transistor to conduct. Transistor 33 will continue to conduct as long as the high potential remains applied. During this time, transistor 30 remains in the non-conducting state. When the high potential is removed, diode 39 increases the discharge rate of capacitor 31, so that transistor 30 will initially conduct when the battery voltage is applied by turning the ignition key to the ON position 1.

Timer 3 generates a time delay by means of a voltage level at ground potential. Thus, when B+ is applied through the ignition ON position 1, ground potential is immediately applied to the collector of transistor 40, and this potential level is held for a predetermined number of seconds, after which the level is switched to high potential. The delay interval is determined by the charging of capacitor 41 through resistor 42. The circuit of timer 3 is analogous to that of timer 2, with the exception of resistor 43, diode 44 which serve as a voltage regulator and the capacitor 46 which replaces diode 39 in timer 2. Timer 3 has NPN transistors 40 and 45 and functions substantially analogous to the PNP transistors in timer 2. The output of the two timers, furthermore, are also analogous. Timer 3, moreover, is used to ascertain that if the "wrong combination" time delay is used, it will not be possible to start the ignition of the engine for approximately 2 minutes. To achieve this arrangement, a high voltage level is fed back to the base of transistor 45, if the ignition key is turned to the ON position 1 too early, to force transistor 45 to be switched on and thereby cause the collector of transistor 45 to be at ground potential, while applying this ground potential also to the base of transistor 40 through capacitor 41. As a result, transistor 40 is switched off and provides, thereby, a high voltage output at the collector of transistor 40. Capacitor 41, which is now fully charged, will remain charged until the battery voltage, B+, is switched off. When the B+ is switched off, capacitor 41 discharges through resistor 42. This discharge consumes approximately two minutes. Capacitor 46 serves to supply the necessary ground potential to the base of transistor 40 during the switching on of the battery voltage, B+, so that unless capacitor 41 has sufficiently discharged, transistor 40 will remain non-conducting or switched off when the ignition key is turned to the ON position. This condition is essential to assure that the automobile lock will not operate.

The remaining resistors and capacitor in the circuits of timers 2 and 3, as shown in FIG. 2, serve as conventional biasing and signal shaping elements.

In the operation of the ignition key unit and the circuits connected thereto, the battery voltage, B+, from the START position 6 is applied through resistor 47 and charges capacitor 48. At the same time, the battery voltage is applied to the base of transistor 49. Since the collector of transistor 49 is already connected to B+, a slightly reduced level of B+ is applied by the emitter of transistor 49 to the coil of relay 50 for actuating this relay. Resistor 51 limits the current through the coil of relay 50, whereas diode 52 serves to suppress the relay coil transient, when the relay opens, corresponding to the time when the B+ is removed. Capacitor 48 and resistor 47 function to delay the application of the battery voltage, B+, to allow the output of timer 2 to switch to high potential and thereby protect the automobile lock arrangement. Resistor 53 serves to discharge the capacitor 48, when the ignition switch is returned to the ON position. The relay contact 50a connects the output of timer 2 to AND gates 4, 5 and 22, by connecting the output of timer 2 to the emitter of transistor 54.

The AND gates 4, 5 and 22 perform the function of determining whether the actuation of the automobile lock has been proper. Thus, it determines whether the user has waited the proper amount of time before turning the ignition key to the START position 6. This occurs during the time when the outputs of timers 2 and 3 are at ground potential. For this purpose, transistor 54 has its emitter effectively grounded through resistor 55. The base of transistor 54 has a regulated B+ applied to it from resistor 56 and diode 57. Since the collector of transistor 40 is also at ground potential, the transistor 58 is in the non-conducting state because the base of transistor 58, via the decoupling resistor 59, is not at high potential. Consequently, transistor 54 can conduct the high voltage level from the base of transistor 60, and current can conduct through the base of transistor 60 and thereby conduct to ground potential through resistor 70. Current then flows through the base of transistor 61, via coupling diodes 62 and 63. Transistor 61 conducts because the battery voltage, B+, is applied to its emitter through filters 64, 65. This applies B+ to the collector of transistor 61, and from there the B+ is applied to the gate of the switch trigger or OR gate 8, by applying the voltage to the SCR 66 via resistor 67. This results in the automobile lock arrangement becoming operative. Resistor 68 serves as the load for the collector of transistor 61 when no current flows to SCR 66. Capacitor 68 and diode 69 serve to protect the transistor 61 from any switching transients from transistor 66.

If the ignition key is turned to the START position before the timer 2 has its output at ground potential, then a high level voltage is applied to the emitter of transistor 54. As a result, this transistor cannot conduct. High voltage is also applied through resistor 71 and diode 72. Diode 72 serves to lower the high potential with resistor 73 to stabilize the zener voltage of this diode. The high potential is applied through diode 74 to the base of transistor 45. This forces the output of timer 3 to switch to high potential. As a result, a high potential is applied through resistor 59 to the base of transistor 58. This high level voltage, furthermore, is applied to the base of transistor 60. The latter cannot conduct so that ultimately the SCR 66 cannot conduct also. As a result, the lock will not be operative.

If the ignition key is turned to the START position 6 after timer 3 has its output at high potential, then the result will be the same as that described immediately above.

The OR gate 8 is a switch trigger circuit in which B+ is applied to the gate terminal or control electrode of SCR 66, via current limiting resistor 67, for turning on this semi-conducting switch 66. Since element 66 is a semi-conducting rectifier (SCR), it remains in the conducting state until B+ is removed from its anode, which is connected to B+ via either diode 75 or diode 76. The cathode of SCR 66 is connected to resistor 77.

In the operation of switch 9, B+ is applied from SCR 66 through current limiting resistor 77, to relay coil 78 for actuating this relay. The actuation of this relay allows current from the automotive distributor to pass through a normally closed Reed switch 79, and now closed contacts 78a of the relay 78. The automobile lock is thereby in the operative state. Diode 80 removes the transient when the relay 78 is de-energized. Reed switch 79 serves to prevent operation of the automobile lock by applying an external magnet. The application of such an external magnet causes relay coil 78 to become energized, but at the same time, Reed switch 79 opens. As a result, the automobile lock will not be operative.

In the operation of the RC trigger circuit 14, 15 and "keep alive" AND gate 16, when SCR 66 conducts, B+ is applied to relay coil 78, and also to capacitor 83 for charging this capacitor through diode 81 and resistor 82. The coil of relay 78 draws current thereby, so that with the voltage drop of resistor 77, the voltage applied to capacitor 83 is at a lower positive potential than the voltage applied to the gate of SCR 66 and to the collector of transistor 84. Thus, transistor 84 will not conduct from its emitter to collector, as long as SCR 66 is in the conducting state. Resistor 85 serves as a load resistor of transistor 84.

The battery voltage B+ is also applied from the ignition ON position (or the accessory ON position) via diodes 75 or 75 to the base of transistor 88, through diode 86 and resistor 87. Resistors 89 and 90 complete the DC path for diode 86, so that this diode will not pass negative transients and damage thereby transistor 88. The collector of transistor 88 is connected to the base of transistor 84, through a current limiting resistor 91.

When the ignition key is turned to the OFF position (and the accessory is not turned on), capacitor 83 which was charged, leaks off its charge through resistors 92 and 93. The discharge time determines how long the automobile lock may be re-started without using its time delay. In this "OFF" condition, there is no high potential applied to the base of transistor 88, and therefore this transistor 88 does not conduct. Consequently, although transistor 84 has a high potential applied to its emitter, and an impedance to ground through its collector, since the base current of transistor 84 is zero, it will not conduct. In this manner, the discharge time of capacitor 83 is determined only by resistors 92 and 93. Within the remaining charging time of capacitor 83 (corresponding to 2 minutes), when the ignition or the accessory is turned on, B+ goes directly then through diodes 75 or 76, diode 86, resistor 87 and to the base of transistor 88. This causes transistor 88 to conduct, and current flows through the base of transistor 84. This causes a high potential, which had been stored in capacitor 83, to be applied to the collector of transistor 84 and then to the gate terminal of the SCR 66. The latter then conducts in the same manner as if it had been fired or actuated via the normal time delay circuitry. Capacitor 83 becomes again recharged, and the cycle can be repeated.

Diodes 75 and 76 form the OR elements for the circuit 8.

To regulate the B+, the battery voltage is applied from the ignition lock through diode 94 to charge capacitor 95 and cause, thereby, transistor 96 to conduct. Capacitor 95 allows a continuous B+ to be applied to the emitter of transistor 96 even though the ignition key switch may open momentarily when it is turned to the START position. Resistor 97 serves to discharge capacitor 95 after a time interval when the ignition key switch is in the OFF position. Resistors 97 and 98 serve as current limiting resistors and attenuator for zener diode 99. In this manner, diode 99 may be regulated to a predetermined level of 6.8 volts, for example.

It is an important aspect of the present invention that the person attempting to open the electronic lock of the present invention must turn the ignition switch from ON to START at the end of the time interval set by the timers 2 and 3. To allow for operator error, the present invention gives the operator a short period of time within which to move the key in the ignition switch from ON to START. The high pulse transmitted by the output of AND gate 4 is the lock release signal, and both this signal as well as the time interval established by timers 2 and 3 are non-sensible, that is, neither the time when the outputs of timers 2 and 3 both become low as well as the output of AND gate 4 (the lock release signal) are capable of being perceived by any of the five senses of the operator. Thus, there are no visible indicia or audible sounds, etc. to provide any clue to the operator that he must attempt to open the lock at any particular period of time. Accordingly, the lock is silent and its "combination" is a secret known only to the owner of the vehicle.

An important advantage of the present invention is the fact that the lock arrangement is incorporated into the ignition circuit of the vehicle "under the hood", with no connections required to be made to any apparatus within the interior of the vehicle. Thus, the firewall of the vehicle need not be penetrated.

What is claimed is:

1. In an engine-powered vehicle having an ignition circuit and an ignition switch means with a plurality of circuit positions, the improvement which comprises an anti-theft arrangement comprising timing means responsive to said switch means and actuated when said switch means is switched to a first position for transmitting a non-sensible lock release signal after a non-sensible predetermined time interval from the instant of actuation of said timing means, said lock release signal having a predetermined duration, and electronic locking means operable in the locked state to disable said engine, said locking means being connected to said timing means for receiving said lock release signal and being responsive to said switch means, said locking means becoming unlocked only when said lock release signal is applied thereto and said switch means is switched to a second position after said time interval and within said duration of said lock release signal, said locking means remaining locked when said switch means is switched to said second position from said first position before or after said duration of said lock release signal, and said locking means includes means responsive to said switch means for inhibiting the unlocking of said locking means for a second predetermined time interval when said switch means is switched from said first position to said second position outside of said duration of said lock release signal.

2. Apparatus according to claim 1, wherein said locking means includes means responsive to said switch means and actuated by the unlocking of the locking means for by-passing said timing means to permit unlocking of said locking means outside of the duration of said lock release signal when said switch means is switched from said first position to said second position.

3. Apparatus according to claim 1, wherein said locking means includes keep-alive means for holding said locking means in the unlocked state for a third predetermined period of time after said switch means has been switched from said first position to said second position within said duration of said lock release signal.

4. Apparatus according to claim 1, wherein said timing means comprises a first timer generating a pulse at a high potential level for a first predetermined interval; a second timer generating a pulse at a low potential level for a second time interval exceeding said first time interval; and said locking means comprises a first AND gate having two inputs each connected to one of said first and second timer, said first AND gate having a pulse output at a high potential level when the two inputs of said first AND gate are at low potential level, a second AND gate having an input connected to the output of said first AND gate, said second AND gate having another input connected to said second position of said switch means, said second AND gate having a pulse output at high potential when both inputs of said second AND gate are at high potential, an OR gate having an input connected to the output of said second AND gate, said OR gate having an output connected to said engine for applying an actuating pulse at high potential to said engine when the output of said second AND gate is at high potential, a timing network connected to the output of to said operating means when the output of said second AND gate is at high potential, a timing network connected to the output of said OR gate, a third AND gate having an input connected to the output of said timing network, said third AND gate having an output connected to another input of said OR gate for by-passing said timing means to permit unlocking of said locking means when said switch means is switched from said first position to said second position outside of said duration.

5. Apparatus according to claim 4, including a fourth AND gate having one input connected to said second position of said switch means and having a second input connected to the output of said first timer; a second timing network with input connected to the output of said fourth AND gate, the output of said second timing network being connected to said second timer for inhibiting said operability of said locking means when switching from said first position to said second position and waiting for said duration to commence.

6. Apparatus according to claim 5, wherein said first and second timing networks are resistor-capacitor networks.

7. Apparatus according to claim 1, wherein said switch means comprises a multi-position ignition key switch.

8. Apparatus according to claim 6, wherein said switch means comprises a multi-position ignition key switch and said locking means comprises a second OR gate having an output connected to another input of said third AND gate, said second OR gate having one input connected to an ignition ON position of said key switch and having a second input connected to a third switch position on said key switch corresponding to an accessory ON position.

* * * * *